US010911112B2

(12) United States Patent
Chen et al.

(10) Patent No.: US 10,911,112 B2
(45) Date of Patent: Feb. 2, 2021

(54) SIGNAL TRANSMISSION METHOD AND DEVICE

(71) Applicant: CHINA ACADEMY OF TELECOMMUNICATIONS TECHNOLOGY, Beijing (CN)

(72) Inventors: Runhua Chen, Beijing (CN); Qiuping Huang, Beijing (CN); Qiubin Gao, Beijing (CN); Rakesh Tamrakar, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 1 day.

(21) Appl. No.: 16/335,660

(22) PCT Filed: Sep. 12, 2017

(86) PCT No.: PCT/CN2017/101367
§ 371 (c)(1),
(2) Date: Mar. 21, 2019

(87) PCT Pub. No.: WO2018/054242
PCT Pub. Date: Mar. 29, 2018

(65) Prior Publication Data
US 2020/0028553 A1 Jan. 23, 2020

(30) Foreign Application Priority Data
Sep. 22, 2016 (CN) .......................... 2016 1 0842889

(51) Int. Cl.
H04W 72/04 (2009.01)
H04B 7/0456 (2017.01)
(Continued)

(52) U.S. Cl.
CPC ......... *H04B 7/0478* (2013.01); *H04B 7/0417* (2013.01); *H04B 7/0617* (2013.01);
(Continued)

(58) Field of Classification Search
CPC .. H04B 7/0478; H04B 7/0417; H04B 7/0617; H04B 7/0626; H04B 7/0639;
(Continued)

(56) References Cited

U.S. PATENT DOCUMENTS

2010/0027697 A1 2/2010 Malladi et al.
2010/0157918 A1 6/2010 Kim et al.
(Continued)

FOREIGN PATENT DOCUMENTS

CN 101536358 A 9/2009
CN 102315872 A 1/2012
(Continued)

OTHER PUBLICATIONS

International Search Report for PCT/CN2017/101367 dated Nov. 30, 2017 and its English translation provided by WIPO.
(Continued)

*Primary Examiner* — Hassan Kizou
*Assistant Examiner* — Mahbubul Bar Chowdhury
(74) *Attorney, Agent, or Firm* — Ladas & Parry, LLP

(57) ABSTRACT

A signal transmission method and device are provided. The method includes: determining a codebook C being a set of matrices W; determining a matrix set Ω={W}∈C from the codebook C; generating one or more layers of signals, beamforming the signals with matrixes in the matrix set Ω, and cyclically mapping the matrixes in the matrix set Ω to different locations of transmission resources; and transmitting the beamformed signals at the different locations of the transmission resources.

17 Claims, 3 Drawing Sheets

(51) Int. Cl.
  *H04B 7/0417* (2017.01)
  *H04B 7/06* (2006.01)
  *H04L 27/26* (2006.01)

(52) U.S. Cl.
  CPC ......... *H04B 7/0626* (2013.01); *H04B 7/0639* (2013.01); *H04L 27/2636* (2013.01)

(58) Field of Classification Search
  CPC . H04B 7/0413; H04B 7/0456; H04L 27/2636; H04L 1/0026; H04L 1/0014; H04L 1/1607
  See application file for complete search history.

(56) References Cited

U.S. PATENT DOCUMENTS

| | | | |
|---|---|---|---|
| 2011/0216846 A1 | 9/2011 | Lee et al. | |
| 2012/0057449 A1* | 3/2012 | Takaoka | H04B 1/713 370/210 |
| 2014/0016714 A1* | 1/2014 | Chen | H04W 24/02 375/260 |
| 2014/0029689 A1* | 1/2014 | Liu | H04B 7/063 375/267 |
| 2014/0226702 A1* | 8/2014 | Onggosanusi | H04B 7/0626 375/219 |
| 2015/0207555 A1* | 7/2015 | Son | H04B 7/0663 375/267 |
| 2015/0304010 A1* | 10/2015 | Zhang | H04B 7/0456 370/329 |
| 2016/0081065 A1 | 3/2016 | Shi et al. | |
| 2016/0323025 A1* | 11/2016 | Liu | H04B 7/0658 |
| 2018/0083676 A1* | 3/2018 | Wei | H04B 7/0452 |
| 2018/0198499 A1* | 7/2018 | Park | H04B 7/0626 |

FOREIGN PATENT DOCUMENTS

| | | |
|---|---|---|
| CN | 102792605 A | 11/2012 |
| CN | 103001742 A | 3/2013 |
| CN | 103220024 A | 7/2013 |
| CN | 103475397 A | 12/2013 |
| CN | 103929266 A | 7/2014 |

OTHER PUBLICATIONS

Written Opinion of the International Searching Authority for PCT/CN2017/101367 dated Nov. 30, 2017 and its English translation provided by Google Translate.
Extended European search report from EP app. No. 17852310.6, dated Sep. 6, 2019.
"Discussion on DMRS based semi-open-loop MIMO", R1-162289, 3GPP TSG RAN WG1 Meeting #84bis, Busan, Korea, Apr. 11-15, 2016.
"Discussion on OL and Semi-OL MIMO scheme", R1-162492, 3GPP TSG RAN WG1 Meeting #84bis, Busan, Korea, Apr. 11-15, 2016.
First Office Action and Search Report from CN app. No. 201610842889.7, dated Nov. 27, 2019, with machine English translation.
Written Opinion of the International Searching Authority from PCT/CN2017/101367, dated Nov. 30, 2017, with English translation from WIPO.
International Preliminary Report on Patentability from PCT/CN2017/101367, dated Mar. 26, 2019, with English translation from WIPO.

* cited by examiner

SIGNAL TRANSMISSION METHOD AND DEVICE

CROSS REFERENCE TO RELATED APPLICATION

The present application is the U.S. national phase of PCT Application PCT/CN2017/101367 filed on Sep. 12, 2017, which claims a priority to Chinese patent application No. 201610842889.7 filed on Sep. 22, 2016, the disclosures of which are incorporated herein by reference in their entireties.

TECHNICAL FIELD

The present disclosure relates to the field of communication technologies, and in particular to a signal transmission method and a signal transmission device.

BACKGROUND

In wireless communication systems, the open-loop multiple-input multiple-output (OL-MIMO) technology is an effective technology to improve communication reliability. By using different precoding at different time/frequency transmission resources, the quality of channel state information (CSI) feedback and the strength of the transmitted signal may be improved, thereby better countering the imperfections of channels. One possible OL-MIMO scheme is to cycle a predefined set of precoding matrices at different time/frequency resources of the data transmission resources. A set of candidate precoding matrices is represented by V={V1, V2, V3, . . . , VN}, where N represents the cardinality of V, and various methods are available for cyclic mapping of precoding matrices in the V. The set of precoding matrices, as well as the mapping of precoding matrices to different time frequency resources, need to be consistent between the transmitter and receiver used for CSI feedback and data transmission.

There is no OL-MIMO scheme based on DMRS (demodulation reference signal) in the wireless communication system in the related art. LTE's TM3 supports the OL-MIMO transmission based on CRS (Cell Reference Signal), but this technology needs to be based on the CRS signals which are cell-specific, of wideband and always existing, is therefore not a promising technology. In the future wireless communication systems, in order to avoid high transmission power consumption, the CRS signal will be reduced or completely removed. Furthermore, the OL-MIMO based on CRS cannot be used in MBSFN subframes because there is no CRS (OFDM symbols 4-14) in the data transmission region of the MBSFN subframe. In order to improve the reliability of DMRS-based transmission, it is necessary to introduce the DMRS-based OL-MIMO.

SUMMARY

A signal transmission method and a signal transmission device are provided in the present disclosure, to improve a transmission performance of a transmission channel.

To solve the above technical issue, the present disclosure provides the following solutions.

A signal transmission method is provided in the present disclosure, including:

determining a codebook C, where the codebook C is a set of matrices W;

determining a matrix set $\Omega=\{W\} \in C$ from the codebook C;

generating one or more layers of signals, beamforming the signals with matrixes in the matrix set $\Omega$, and cyclically mapping the matrixes in the matrix set $\Omega$ to different locations of transmission resources; and transmitting the beamformed signals at the different locations of the transmission resources.

Optionally, each matrix W is generated by transforming a phase $\phi$ of at least one Discrete Fourier Transform DFT vector V;

a set of DFT vectors corresponding to the matrices W in the matrix set $\Omega$ constitutes a group of adjacent DFT vectors $V=\{V_1, V_2, \ldots V_N\}$;

a set of phases corresponding to the matrices W in the matrix set $\Omega$ constitutes a set of adjacent phases $\Theta=\{\phi_1, \phi_2, \ldots \phi_K\}$;

the DFT vectors corresponding to the matrices W mapped to adjacent transmission resources are discontinuous in $V=\{V_1, V_2, \ldots V_N\}$, or the phases $\phi$ corresponding to the matrices W mapped to adjacent transmission resources are discontinuous in $\Theta=\{\phi_1, \phi_2, \ldots \phi_K\}$.

Optionally, the codebook C is of a dual-stage codebook structure, and in the codebook C, the matrices $W=W_1 W_2=W_1 W_{2b} W_{2c}$;

Optionally, each in the $W_1$ matrix is formed by N DFT beams which are adjacent to each other and oriented at different angles, where N is a positive integer;

a second-stage precoding matrix $W_{2b}=\{w_{2b,1}, \ldots w_{2b,L}\}$ is configured to perform a selection for beams in the $W_1$, where $w_{2b,1}, \ldots w_{2b,L}$ are beam selection matrices, L is a positive integer;

a cyclic mapping manner of the $w_{2b,1}, \ldots w_{2b,L}$ is: selecting, from the matrices in the $W_1$, the matrices corresponding to the discontinuous DFT vectors for the adjacent transmission resources;

a second-stage precoding matrix $W_{2c}=\{w_{2c,k}\}_{k=1,2,\ldots}$ is configured to perform phase rotations for the beams in the $W_1$, where $w_{2c,k}$ is a phase transformation matrix.

Optionally, the codebook C is of a dual-stage codebook structure, and in the codebook C, the matrices $W=W_1 W_2=W_1 W_{2b} W_{2c}$;

Optionally, each $W_1$ matrix is formed by N DFT vectors which are adjacent to each other and oriented at different angles, where N is a positive integer;

a second-stage precoding matrix $W_{2b}=\{w_{2b,1}, \ldots w_{2b,L}\}$ is configured to perform a selection for the DFT vectors in the $W_1$, where $w_{2b,1}, \ldots w_{2b,L}$ are beam selection matrices, L is a positive integer;

a cyclic mapping manner of the $w_{2b,1}, \ldots w_{2b,L}$ is: selecting, from the matrices in the $W_1$, the matrices corresponding to the same or different DFT vectors for the adjacent transmission resources, where the selected DFT vectors are continuous or discontinuous when different DFT vectors are selected;

a second-stage precoding matrix $W_{2c}=\{w_{2c,k}\}_{k=1,2,\ldots}$ is configured to perform phase rotations for the beams in the $W_1$, where $w_{2c,k}$ is a phase transformation matrix, and a cyclic mapping manner of the $w_{2c,1}, \ldots w_{2c,K}$ is: selecting discontinuous phases from the second-stage precoding matrix $W_{2c}=\{w_{2c,k}\}_{k=1,2,\ldots}$.

Optionally, $\Theta=\{0,\pi\}$ or $\Theta=\{\pi/2, 3\pi/2\}$.

Optionally, a degree of separation of the matrices mapped to two adjacent transmission resources is greater than a preset value.

Optionally, the degree of separation of two matrices in the $W_{2b}$ mapped to the two adjacent transmission resources is maximized based on a distance measurement value, the degree of separation of the two matrices in the $W_{2b}$ is greater than a first preset value.

Optionally, a distance between the phase transformation matrices $w_{2c,k}$ in the $W_{2c}$ mapped to the adjacent transmission resources is greater than a second preset value.

Optionally, the method further includes: transmitting indication information of a determined group of matrices which are enabled to be cyclically mapped to different transmission resources.

Optionally, the transmitting the indication information of the determined group of matrices which are enabled to be cyclically mapped to the different transmission resources includes:

transmitting the indication information of the determined group of matrices which are enabled to be cyclically mapped to the different transmission resources by a semi-static signaling or a dynamic signaling.

A signal transmission device is further provided in the present disclosure, including:

a first determining module, configured to determine a codebook C, wherein the codebook C is a set of matrices W;

a second determining module, configured to determine a matrix set $\Omega=\{W\}\in C$ from the codebook C; and a transmission module, configured to generate one or more layers of signals, beamform the signals with matrixes in the matrix set $\Omega$, cyclically map the matrixes in the matrix set $\Omega$ to different locations of transmission resources, and transmit the beamformed signals at the different locations of the transmission resources.

Optionally, each matrix W is generated by transforming a phase $\phi$ of at least one Discrete Fourier Transform DFT vector V;

a set of DFT vectors corresponding to the matrices W in the matrix set $\Omega$ constitutes a group of adjacent DFT vectors $V=\{V_1, V_2, \ldots V_N\}$;

a set of phases corresponding to the matrices W in the matrix set $\Omega$ constitutes a set of adjacent phases $\Theta=\{\phi_1, \phi_2, \ldots \phi_K\}$;

the DFT vectors corresponding to the matrices W mapped to adjacent transmission resources are discontinuous in $V=\{V_1, V_2, \ldots V_N\}$, or the phases $\phi$ corresponding to the matrices W mapped to adjacent transmission resources are discontinuous in $\Theta=\{\phi_1, \phi_2, \ldots \phi_K\}$.

Optionally, the codebook C is of a dual-stage codebook structure, and in the codebook C, the matrices $W=W_1W_2=W_1W_{2b}W_{2c}$;

Optionally, each $W_1$ matrix is formed by N DFT beams which are adjacent to each other and oriented at different angles, where N is a positive integer;

a second-stage precoding matrix $W_{2b}=\{w_{2b,1}, \ldots w_{2b,L}\}$ is configured to perform a selection for beams in the $W_1$, where $w_{2b,1}, \ldots w_{2b,L}$ are beam selection matrices, L is a positive integer;

a cyclic mapping manner of the $w_{2b,1}, \ldots w_{2b,L}$ is: selecting, from the matrices in the $W_1$, the matrices corresponding to the discontinuous DFT vectors for the adjacent transmission resources;

a second-stage precoding matrix $W_{2c}=\{w_{2c}\}_{k=1, 2, \ldots}$ is configured to perform phase rotations for the beams in the $W_1$, where $w_{2c,k}$ is a phase transformation matrix.

Optionally, the codebook C is of a dual-stage codebook structure, and in the codebook C, the matrices $W=W_1W_2=W_1W_{2b}W_{2c}$;

Optionally, each $W_1$ matrix is formed by N DFT vectors which are adjacent to each other and oriented at different angles, where N is a positive integer;

a second-stage precoding matrix $W_{2b}=\{w_{2b,1}, \ldots w_{2b,L}\}$ is configured to perform a selection for the DFT vectors in the $W_1$, where $w_{2b,1}, \ldots w_{2b,L}$ are beam selection matrices, L is a positive integer;

a cyclic mapping manner of the $w_{2b,1}, \ldots w_{2b,L}$ is: selecting, from the matrices in the $W_1$, the matrices corresponding to the same or different DFT vectors for the adjacent transmission resources, where the selected DFT vectors are continuous or discontinuous when different DFT vectors are selected;

a second-stage precoding matrix $W_{2c}=\{w_{2c,k}\}_{k=1, 2, \ldots}$ is configured to perform phase rotations for the beams in the $W_1$, where $w_{2c,k}$ is a phase transformation matrix, and a cyclic mapping manner of the $w_{2c,1}, \ldots w_{2c,K}$ is: selecting discontinuous phases from the second-stage precoding matrix $W_{2c}=\{w_{2c,k}\}_{k=1, 2, \ldots}$.

Optionally, $\Theta=\{0, \pi\}$ or $\Theta=\{\pi/2, 3\pi/2\}$.

Optionally, a degree of separation of the matrices mapped to two adjacent transmission resources is greater than a preset value.

Optionally, the degree of separation of two matrices in the $W_{2b}$ mapped to the two adjacent transmission resources is maximized based on a distance measurement value, the degree of separation of the two matrices in the $W_{2b}$ is greater than a first preset value.

Optionally, a distance between the phase transformation matrices $w_{2c,k}$ in the $W_{2c}$ mapped to the adjacent transmission resources is greater than a second preset value.

Optionally, the transmission module is further configured to transmit indication information of a determined group of matrices which are enabled to be cyclically mapped to different transmission resources.

Optionally, the transmission module is further configured to transmit the indication information of the determined group of matrices which are enabled to be cyclically mapped to the different transmission resources by a semi-static signaling or a dynamic signaling.

A signal transmission method is further provided in the present disclosure, including:

acquiring a determined group of matrices which are enabled to be cyclically mapped to different transmission resources, where a matrix set $\Omega=\{W\}\in C$, a codebook C is a set of matrices W;

receiving beamformed signals transmitted at different locations of the transmission resources, where the beamformed signals are obtained by beamforming one or more layers of signals through the matrices.

Optionally, each matrix W is generated by transforming a phase $\phi$ of at least one Discrete Fourier Transform DFT vector V;

a set of DFT vectors corresponding to the matrices W in the matrix set $\Omega$ constitutes a group of adjacent DFT vectors $V=\{V_1, V_2, \ldots V_N\}$;

a set of phases corresponding to the matrices W in the matrix set $\Omega$ constitutes a set of adjacent phases $\Theta=\{\phi_1, \phi_2, \ldots \phi_K\}$;

the DFT vectors corresponding to the matrices W mapped to adjacent transmission resources are discontinuous in $v=\{V_1, V_2, \ldots V_N\}$, or the phases $\phi$ corresponding to the matrices W mapped to adjacent transmission resources are discontinuous in $\Theta=\{\phi_1, \phi_2, \ldots \phi_K\}$.

Optionally, the codebook C is of a dual-stage codebook structure, and in the codebook C, the matrices $W=W_1W_2=W_1W_{2b}W_{2c}$;

Optionally, each $W_1$ matrix is formed by N DFT beams which are adjacent to each other and oriented at different angles, where N is a positive integer;

a second-stage precoding matrix $W_{2b}=\{W_{2b,1}, \ldots w_{2b,L}\}$ is configured to perform a selection for beams in the $W_1$, where $w_{2b,1}, \ldots w_{2b,L}$ are beam selection matrices, L is a positive integer;

a cyclic mapping manner of the $w_{2b,1}, \ldots w_{2b,L}$ is: selecting, from the matrices in the $W_1$, the matrices corresponding to the discontinuous DFT vectors for the adjacent transmission resources;

a second-stage precoding matrix $W_{2c}=\{w_{2c,k}\}_{k=1, 2, \ldots}$ is configured to perform phase rotations for the beams in the $W_1$, where $w_{2c,k}$ is a phase transformation matrix.

Optionally, the codebook C is of a dual-stage codebook structure, and in the codebook C, the matrices $W=W_1W_2=W_1W_{2b}W_{2c}$;

Optionally, each $W_1$ matrix is formed by N DFT vectors which are adjacent to each other and oriented at different angles, where N is a positive integer;

a second-stage precoding matrix $W_{2b}=\{W_{2b,1}, \ldots w_{2b,L}\}$ is configured to perform a selection for the DFT vectors in the $W_1$, where $w_{2b,1}, \ldots w_{2b,L}$ are beam selection matrices, L is a positive integer;

a cyclic mapping manner of the $w_{2b,1}, \ldots w_{2b,L}$ is: selecting, from the matrices in the $W_1$, the matrices corresponding to the same or different DFT vectors for the adjacent transmission resources, where the selected DFT vectors are continuous or discontinuous when different DFT vectors are selected;

a second-stage precoding matrix $W_{2c}=\{w_{2c,k}\}_{k=1, 2, \ldots}$ is configured to perform phase rotations for the beams in the $W_1$, where $w_{2c,k}$ is a phase transformation matrix, and a cyclic mapping manner of the $w_{2c,1}, \ldots w_{2c,K}$ is: selecting discontinuous phases from the second-stage precoding matrix $W_{2c}=\{w_{2c,k}\}_{k=1, 2, \ldots}$.

A signal transmission device is further provided in the present disclosure, including:

an acquisition module, configured to acquire a determined group of matrices which are enabled to be cyclically mapped to different transmission resources, where a matrix set $\Omega=\{W\}\in C$, a codebook C is a set of matrices W;

a receiving module, configured to receive beamformed signals transmitted at different locations of the transmission resources, where the beamformed signals are obtained by beamforming one or more layers of signals through the matrices.

An uplink channel feedback method is further provided in the present disclosure, including:

determining, by a sending apparatus, a group of matrices which are enabled to be cyclically mapped to different transmission resources;

transmitting, by the sending apparatus, one or more layers of data precoded by the matrices to a receiving apparatus;

receiving, by the sending apparatus, a feedback of channel state information CSI sent by the receiving apparatus, where the CSI includes indication information configured to indicate a selected precoding matrix.

Optionally, the method further includes: indicating, by the sending apparatus, a plurality of matrices to the receiving apparatus.

A sending apparatus is further provided in the present disclosure, including:

a determining module, configured to determine a group of matrices which are enabled to be cyclically mapped to different transmission resources;

a transmitting module, configured to transmit one or more layers of data precoded by the matrices to a receiving apparatus; and a receiving module, configured to receive a feedback of channel state information CSI sent by the receiving apparatus, where the CSI includes indication information configured to indicate a selected precoding matrix.

A uplink channel feedback method is further provided in the present disclosure, including:

receiving, by a receiving apparatus, a plurality of matrices being a group of matrices which are enabled to be cyclically mapped to different transmission resources;

generating, by the receiving apparatus, channel state information CSI including indication information configured to indicate a selected matrix; and sending, by the receiving apparatus, the CSI to the sending apparatus.

A receiving apparatus is further provided in the present disclosure, including:

a receiving module, configured to receive a plurality of matrices being a group of matrices which are enabled to be cyclically mapped to different transmission resources;

a feedback module, configured to generate channel state information CSI including indication information configured to indicate a selected matrix; and a sending module, configured to send the CSI to the sending apparatus.

A signal transmission device is further provided in the present disclosure, including a processor, a transceiver and a memory, the processor is configured to read a program in the memory to:

determine a codebook C, where the codebook C is a set of matrices W;

determine a matrix set $\Omega=\{W\}\in C$ from the codebook C; and generate one or more layers of signals, beamform the signals with matrixes in the matrix set $\Omega$, cyclically map the cyclically map to different locations of transmission resources and transmit the beamformed signals at the different locations of the transmission resources;

the transceiver is configured to receive and transmit data; and the memory is configured to store data used by the processor when performing an operation.

A signal transmission device is further provided in the present disclosure, including a processor, a transceiver and a memory, the processor is configured to read a program in the memory to:

acquire a determined group of matrices which are enabled to be cyclically mapped to different transmission resources, where a matrix set $\Omega=\{W\}\in C$, a codebook C is a set of matrices W; and receive beamformed signals transmitted at different locations of the transmission resources, where the beamformed signals are obtained by beamforming one or more layers of signals through the matrices;

the transceiver is configured to receive and transmit data; and the memory is configured to store data used by the processor when performing an operation.

A sending apparatus is further provided in the present disclosure, including a processor, a transceiver and a memory, the processor is configured to read a program in the memory to:

determine a group of matrices which are enabled to be cyclically mapped to different transmission resources;

transmit one or more layers of data precoded by the matrices to a receiving apparatus; and receive a feedback of channel state information CSI sent by the receiving apparatus, where the CSI includes indication information configured to indicate a selected precoding matrix;

the transceiver is configured to receive and transmit data; and the memory is configured to store data used by the processor when performing an operation.

A receiving apparatus is further provided in the present disclosure, including a processor, a transceiver and a memory, the processor is configured to read a program in the memory to:

receive a plurality of matrices being a group of matrices which are enabled to be cyclically mapped to different transmission resources;

generate channel state information CSI including indication information configured to indicate a selected matrix; and send the CSI to the sending apparatus;

the transceiver is configured to receive and transmit data; and the memory is configured to store data used by the processor when performing an operation.

The technical effect of the present disclosure at least includes:

According to the present disclosure, a group of matrices which are enabled to be cyclically mapped to different transmission resources is determined, and the beamformed signals, which are obtained by beamforming one or more layers of signals through the matrices, are transmitted at different locations of the transmission resources, thereby improving the transmission performance of the transmission channel.

DETAILED DESCRIPTION

Figure 1:
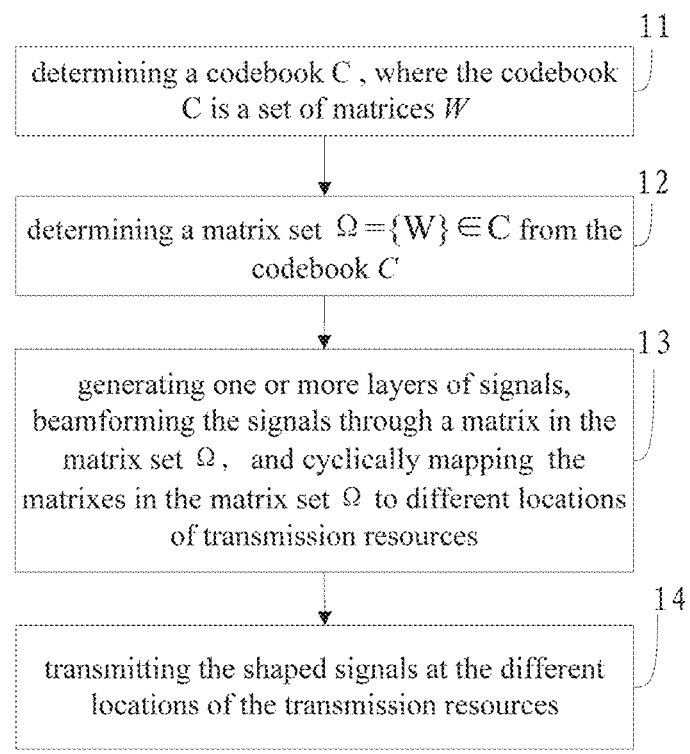
FIG. 1 is a flowchart of a signal transmission method in some embodiments of the present disclosure.

The present disclosure will be described hereinafter in conjunction with the drawings. Although the embodiments of the present disclosure are shown in the drawings, it should be appreciated that the embodiments shall not be used to limit the scope of the present disclosure. Instead, the embodiments are used to make those skilled in the art to better understand the present disclosure and know the scope of the present disclosure.

As shown in FIG. 1, a signal transmission method is provided in some embodiments of the present disclosure, including:

Step 11: determining a codebook C, where the codebook C is a set of matrices W;

Step 12: determining a matrix set $\Omega=\{W\}\in C$ from the codebook C;

The codebook is of a dual-stage codebook structure or a more-than-dual-stage codebook structure.

Step 13: generating one or more layers of signals, beamforming (or precoding) the signals with matrixes in the matrix set $\Omega$, and cyclically mapping the matrixes in the matrix set $\Omega$ to different locations of transmission resources;

Step 14: transmitting the beamformed (or precoded) signals at the different locations of the transmission resources.

According to some embodiments of the present disclosure, a group of matrices which are enabled to be cyclically mapped to different transmission resources is determined, and the beamformed signals, which are obtained by beamforming one or more layers of signals through the matrices, are transmitted at different locations of the transmission resources, thereby improving the transmission performance of the transmission channel.

Figure 2:
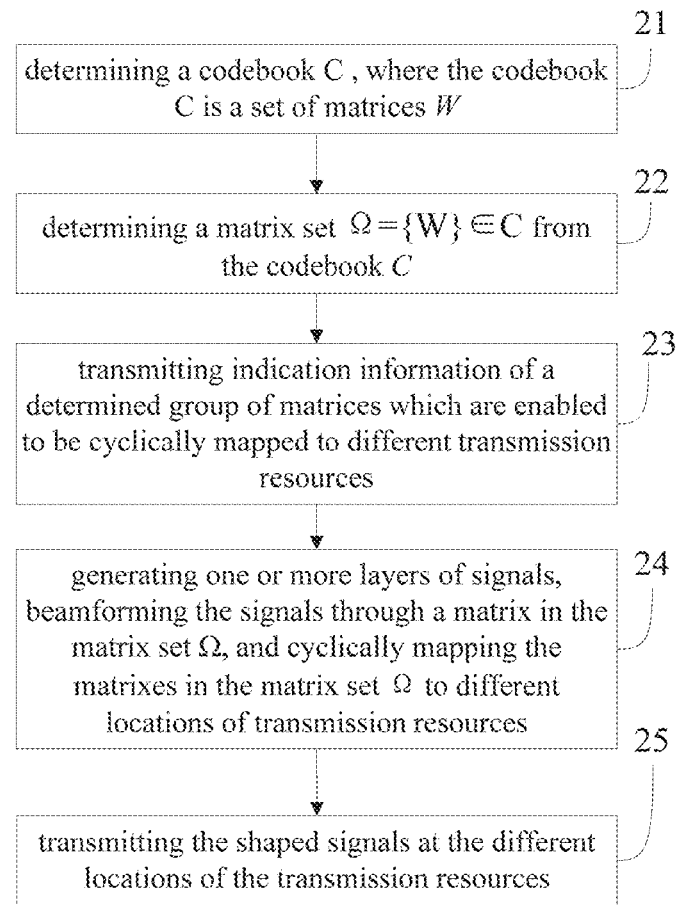
FIG. 2 is a flowchart of a signal transmission method in some embodiments of the present disclosure.

As shown in FIG. 2, a signal transmission method is provided in some embodiments of the present disclosure, including:

Step 21: determining a codebook C, where the codebook C is a set of matrices W.

Step 22: determining a matrix set $\Omega=\{W\}\in C$ from the codebook C.

The codebook is of a dual-stage codebook structure or a more-than-dual-stage codebook structure.

Step 23: transmitting indication information of a determined group of matrices which are enabled to be cyclically mapped to different transmission resources.

Specifically, the indication information of the determined group of matrices which are enabled to be cyclically mapped to the different transmission resources is transmitted by a semi-static signaling or a dynamic signaling, and this step is optional.

Step 24: generating one or more layers of signals, beamforming the signals with matrixes in the matrix set $\Omega$, and cyclically mapping the matrixes in the matrix set $\Omega$ to different locations of transmission resources.

Step 25: transmitting the beamformed signals at the different locations of the transmission resources.

According to some embodiments of the present disclosure, a group of matrices which are enabled to be cyclically mapped to different transmission resources is determined and then sent to the receiving apparatus, and the beamformed signals, which are obtained by beamforming one or more layers of signals through the matrices, are transmitted at different locations of the transmission resources, thereby improving the transmission performance of the transmission channel.

In some embodiments of the present disclosure, each matrix W is generated by transforming a phase $\phi$ of at least one Discrete Fourier Transform DFT vector V.

A set of DFT vectors corresponding to the matrices W in the matrix set $\Omega$ constitutes a group of adjacent DFT vectors $V=\{V_1, V_2, \ldots V_N\}$.

A set of phases corresponding to the matrices W in the matrix set $\Omega$ constitutes a set of adjacent phases $\Theta=\{\phi_1, \phi_2, \ldots \phi_K\}$.

The DFT vectors corresponding to the matrices W mapped to adjacent transmission resources are discontinuous in $v=\{V_1, V_2, \ldots V_N\}$, or the phases $\phi$ corresponding to the matrices W mapped to adjacent transmission resources are discontinuous in $\Theta=\{\phi_1, \phi_2, \ldots \phi_K\}$.

Optionally, the codebook C is of a dual-stage codebook structure, and in the codebook C, the matrices $W=W_1W_2=W_1W_{2b}W_{2c}$;

Optionally, each $W_1$ matrix is formed by N DFT beams which are adjacent to each other and oriented at different angles, where N is a positive integer.

A second-stage precoding matrix $W_{2b}=\{w_{2b,1}, \ldots w_{2b,L}\}$ is configured to perform a selection for beams in the $W_1$, where $w_{2b,1}, \ldots w_{2b,L}$ are beam selection matrices, L is a positive integer. A cyclic mapping manner of the $w_{2b,1}, \ldots w_{2b,L}$ is: selecting, from the matrices in the $W_1$, the matrices corresponding to the discontinuous DFT vectors for the adjacent transmission resources.

A second-stage precoding matrix $W_{2c}=\{w_{2c,k}\}_{k=1, 2, \ldots}$ is configured to perform phase rotations for the beams in the $W_1$, where $w_{2c,k}$ is a phase transformation matrix.

Optionally, the codebook C is of a dual-stage codebook structure, and in the codebook C, the matrices $W=W_1W_2=W_1W_{2b}W_{2c}$.

Optionally, each $W_1$ matrix is formed by N DFT vectors which are adjacent to each other and oriented at different angles, where N is a positive integer.

A second-stage precoding matrix $W_{2b}=\{w_{2b,1}, \ldots w_{2b,L}\}$ is configured to perform a selection for the DFT vectors in the $W_1$, where $w_{2b,1}, \ldots w_{2b,L}$ are beam selection matrices, L is a positive integer.

A cyclic mapping manner of the $w_{2b,1}, \ldots w_{2b,L}$ is: selecting, from the matrices in the $W_1$, the matrices corresponding to the same or different DFT vectors for the adjacent transmission resources, where the selected DFT vectors are continuous or discontinuous when different DFT vectors are selected.

A second-stage precoding matrix $W_{2c}=\{w_{2c,k}\}_{k=1, 2, \ldots}$ is configured to perform phase rotations for the beams in the $W_1$, where $w_{2c,k}$ is a phase transformation matrix, and a cyclic mapping manner of the $w_{2c,1}, \ldots w_{2c,K}$ is: selecting discontinuous phases from the second-stage precoding matrix $w_{2c}=\{w_{2c,k}\}_{k=1, 2, \ldots}$.

In the above embodiments, $\Theta=\{0,\pi\}$ or $\Theta=\{\pi/2,3\pi/2\}$.

Specifically, the first-stage precoding matrix $W_1=\{w_{1,k}\}$, where $$w_{1,k} = \begin{pmatrix} X_{1,k} & 0 \\ 0 & X_{1,k} \end{pmatrix}.$$

For example, taking 4Tx/8Tx LTE codebook as an example, $X_{1,k}=\{V_{k,1}, V_{k,2}, \ldots V_{k,N}\}$ represents a set of N precoding vectors when transmitting a layer of data, and each precoding vector corresponds to one beam.

$$V_l = \begin{bmatrix} 1 & e^{\frac{j2\pi l}{NtO}} & \ldots & e^{\frac{j2\pi l(Nt-1)}{NtO}} \end{bmatrix}$$

$1 \le l \le N$, where $N_t$ is the number of transmit antenna ports, and O is the oversampling rate.

If $w_{1,k}$ and $w_{1,k+1}$ have N/2 overlapping beams, and then the codebook W1 has 2ONt/N matrices, otherwise W1 has ONt/N matrices.

For the second-stage precoding matrix $W_2$, when transmitting a layer of data, each $W_{2b,1}$ consists of a set of column selection vectors $\{e_1, e_2, \ldots e_N\}$, where $e_i$ is the $i^{th}$ column of $I_N$, $1 \le l \le L$.

When transmitting two layers of data, $$W_{2b} = \left\{ \begin{pmatrix} w_{2b,k} & 0 \\ 0 & w_{2b,k} \end{pmatrix} \right\}_{k=1,2,\ldots},$$

k=0, 1, ... L; each $w_{2b,l}$ consists of a set of column selection matrices $\{(e_1,e_1), (e_2,e_2), \ldots (e_N,e_N)\}$, the columns thereof are a subset of $\{e_1, e_2, \ldots e_N\}$, where $e_i$ is the $i^{th}$ column of $I_{N\times N}$, $I_{N\times N}$ is N*N unit array IN, $1 \le l \le L$.

That is, $\{e_1, e_2, \ldots e_N\}$ means a continuous selection (or considered to be a continuous DFT beams) from the W1 matrix.

For the second-stage precoding matrix $W_2$, when transmitting a layer of data, $W_{2c}=\{w_{2c,1}, \ldots w_{2c,M}\}$, where $w_{2c,k}=[1, \varphi_k]$, $\varphi_k=\exp(j2\pi/M*(k-1))$ where $\varphi_k$ is the phase rotation vector used to combine beamforming angels at two polarization directions, j is a constant, where $1 \le k \le M$. In the LTH codebook, in some scenarios $\varphi_k=\{0,1/2,1,3/2\}\pi$.

When transmitting two layers of data, $W_{2c}=\{w_{2c,k}\}_{k=1, 2, \ldots}$, which is $$\left\{ \begin{pmatrix} 1 & 1 \\ \varphi_k & -\varphi_k \end{pmatrix} \right\},$$

or $w_{2c,k}$ is in the form of $(e_i\ e_j)$, where $1 \le i \le N, 1 \le j \le N, i \ne j$.

When N=4, $\varphi_k=\{0, 1/2,1,3/2\}\pi$, the column selection matrix of $W_{2c}$ may be one of the following matrices: $\{(e1\ e1), (e2\ e2), (e3\ e3), (e4\ e4)\}$, that is, the two layers of data use the same DFT beamforming vector, the phase rotation codebook $W_{2c}=\{w_{2c,k}\}_{k=1, 2, \ldots}$, which may be written as $$\left\{ \begin{pmatrix} 1 & 1 \\ \varphi_k & -\varphi_k \end{pmatrix} \right\},$$

where $\varphi_k=\{0,1/2,1,3/2\}\pi$.

The matrix in $W_{2c}$ may also be in the form of $(e_i\ e_j)$, $1 \le i \le N$, $1 \le j \le N$, $i \ne j$, that is, the two layers of data select different DFT beams.

In addition, in some embodiments, a degree of separation of the matrices mapped to two adjacent transmission resources is greater than a preset value.

Specifically, the degree of separation of two matrices in the $W_{2b}$ mapped to the two adjacent transmission resources is maximized based on a distance measurement value, the degree of separation of the two matrices in the $W_{2b}$ is greater than a first preset value.

The degree of separation of the two matrices in the $W_{2b}$ is greater than the first preset value. The distance measurement value may be an Euclidean distance, or a Chebychev distance, or other possible distance measurement values.

A distance between the phase transformation matrices $w_{2c,k}$ in the $W_{2c}$ mapped to the adjacent transmission resources is greater than a second preset value Specifically, the precoding cycle in the present disclosure is not limited to the set $\{(e_1,e_1), (e_2,e_2), \ldots (e_N,e_N)\}$.

For rank-1, a cycle of the precoding based on the beam selection codebook $W_{2b}=\{W_{2b,1}, \ldots w_{2b,L}\}$ is designed to select a discontinuous or non-sequential DFT beams from the matrix of w1 for the precoding of adjacent time/frequency resources.

Specifically, in some embodiments of the present disclosure, the degree of separation of two matrices in the $W_{2b}$ mapped to two adjacent time/frequency resources is maximized base on a single or multiplex distance measurement values.

This distance measurement value may be an Euclidean distance, or a Chebychev distance, or other possible distance measurement values.

The purpose of such mapping is to obtain a maximal diversity gain by maximizing the difference of the equivalent precoding channels of two adjacent time/frequency resources.

This is because the wireless propagation channel is continuous, and the closer the two time/frequency resources are, the more relevant they are. The greater the degree of separation of the precoding matrices mapped to two adjacent time/frequency resources (i.e., the greater the distance is), the more possible the receiving apparatus eliminates the channel deep fading and the receive performance is more robust.

In some embodiments of the present disclosure, assuming $W_{2b}=\{e1,e2,e3,e4\}$, the cycle of W is designed to map to adjacent time/frequency resources through the following $W_2$, matrix:

In some embodiments of the present disclosure, {e1, e3, e2, e4} are mapped to four continuous time/frequency resources.

In some embodiments of the present disclosure, {e1, e4, e2, e3} are mapped to four continuous time/frequency resources.

Similarly, for rank-2, a cycle of the precoding based on the codebook $W_{2b}=\{w_{2b,1}, \ldots w_{2b,L}\}$ is designed to increase (or maximize) a distance of two precoding matrices mapped to adjacent time/frequency resources.

In some embodiments of the present disclosure, $W_{2b}=\{$(e1,e1), (e2,e2), (e3,e3), (e4,e4)$\}$. The cycle of W is designed to map to four precoding matrices for the cycle of the corresponding $W_{2b}=\{$(e1, e1), (e2,e2), (e3, e3), (e4, e4)$\}$ through the following manners.

In some embodiments of the present disclosure, {(e1, e1), (e3, e3), (e2, e2), (e4, e4)} are mapped to four adjacent time/frequency resources.

In some embodiments of the present disclosure, {(e1, e1), (e4, e4), (e2, e2), (e3, e3)} are mapped to four adjacent time/frequency resources.

Accordingly, the set $W_{2c}$ of co-phasing matrices may be represented as $W_{2c}=\{w_{2c,1} \ldots w_{2c,M}\}$.

By the same token, the mapping of the co-phasing matrices in $W_{2c}$ should ensure that the distance between the precoding matrices mapped to adjacent time/frequency resources is as large as possible.

For rank-1, assuming $W_{2c}=\{w_{2c,1}, \ldots w_{2c,M}\}$, where $w_{2c,M}=[1, \varphi_m]$, $\varphi_m=\exp(j2\pi/M*(m-1))$.

In some embodiments of the present disclosure, M=4, and $\varphi_m=\{0, 1, \frac{1}{2}, 3/2\}$ are mapped to adjacent time/frequency resources.

For rank-2, $W_{2c}=\{w_{2c,k}\}_{k=1, 2, \ldots}$, which is $$\left\{\begin{pmatrix} 1 & 1 \\ \varphi_k & -\varphi_k \end{pmatrix}\right\},$$

or $w_{2c,k}$ is in the form of $(e_i \ e_j)$, where $1 \leq i \leq N, 1 \leq j \leq N, i \neq j$.

Some more detailed embodiments are provided below. Without loss of generality, the 8Tx (8-port) LTE dual-stage codebook structure is taken as an example.

In some embodiments of the present disclosure, an LTE 8Tx is of a dual-stage codebook structure.

For 8Tx, the codebook for rank-1 is:

| $i_1$ | $i_2$ | | | |
|---|---|---|---|---|
| | 0 | 1 | 2 | 3 |
| 0-15 | $W_{2i_1,0}^{(1)}$ | $W_{2i_1,1}^{(1)}$ | $W_{2i_1,2}^{(1)}$ | $W_{2i_1,3}^{(1)}$ |
| $i_1$ | $i_2$ | | | |
| | 4 | 5 | 6 | 7 |
| 0-15 | $W_{2i_1+1,0}^{(1)}$ | $W_{2i_1+1,1}^{(1)}$ | $W_{2i_1+1,2}^{(1)}$ | $W_{2i_1+1,3}^{(1)}$ |
| $i_1$ | $i_2$ | | | |
| | 8 | 9 | 10 | 11 |
| 0-15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ |
| $i_1$ | $i_2$ | | | |
| | 12 | 13 | 14 | 15 |
| 0-15 | $W_{2i_1+3,0}^{(1)}$ | $W_{2i_1+3,1}^{(1)}$ | $W_{2i_1+3,2}^{(1)}$ | $W_{2i_1+3,3}^{(1)}$ | where $W_{m,n}^{(1)} = \frac{1}{\sqrt{8}}\begin{bmatrix} v_m \\ \varphi_n v_m \end{bmatrix}$ The codebook for rank-2 is:

| $i_1$ | $i_2$ | | | |
|---|---|---|---|---|
| | 0 | 1 | 2 | 3 |
| 0-15 | $W_{2i_1,2i_1,0}^{(2)}$ | $W_{2i_1,2i_1,1}^{(2)}$ | $W_{2i_1+1,2i_1+1,0}^{(2)}$ | $W_{2i_1+1,2i_1+1,1}^{(2)}$ |
| $i_1$ | $i_2$ | | | |
| | 4 | 5 | 6 | 7 |
| 0-15 | $W_{2i_1+2,2i_1+2,0}^{(2)}$ | $W_{2i_1+2,2i_1+2,1}^{(2)}$ | $W_{2i_1+3,2i_1+3,0}^{(2)}$ | $W_{2i_1+3,2i_1+3,1}^{(2)}$ |
| $i_1$ | $i_2$ | | | |
| | 8 | 9 | 10 | 11 |
| 0-15 | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ |

| | $i_2$ | | | |
|---|---|---|---|---|
| $i_1$ | 12 | 13 | 14 | 15 |
| 0–15 | $W_{2i_1,2i_1+3,0}^{(2)}$ | $W_{2i_1,2i_1+3,1}^{(2)}$ | $W_{2i_1+1,2i_1+3,0}^{(2)}$ | $W_{2i_1+1,2i_1+3,1}^{(2)}$ | where $W_{m,m',n}^{(2)} = \frac{1}{4}\begin{bmatrix} v_m & v_{m'} \\ \varphi_n v_m & -\varphi_n v_{m'} \end{bmatrix}$ The numbers of W1 and W2 are denoted by i1 and i2, respectively.

For rank-1:
i2=0, 1, 2, 3 corresponds to the first beam of W1 (i.e., e1);
i2=4, 5, 6, 7 corresponds to the second beam of W1 (i.e., e2);
i2=8, 9, 10, 11 corresponds to the third beam of W1 (i.e., e3);
i2=12, 13, 14, 15 corresponds to the fourth beam of W1 (i.e., e4).

For rank-2:
i2=0, 1 corresponds to the beam pair (e1, e1);
i2=2, 3 corresponds to the beam pair (e2, e2);
i2=4, 5 corresponds to the beam pair (e3, e3);
i2=6, 7 corresponds to the beam pair (e4, e4);
i2=8, 9 corresponds to the beam pair (e1, e2);
i2=10, 11 corresponds to the beam pair (e2, e3);
i2=12, 13 corresponds to the beam pair (e1, e4);
i2=14, 15 corresponds to the beam pair (e2, e4).

The method in the above embodiments is to maximize the distance of the cyclic precoding matrix.

For rank-1, if the beam selection matrix (w2b) of the precoding matrix cycle uses the order of {e1, e4, e2, e3}, co-phasing uses $\varphi_m$={0, 1, ½, 3/2}pi, then the cycle of W2(i2) uses an order of {0, 2, 1, 3, 12, 14, 13, 15, 4, 6, 5, 7, 8, 10, 9, 11}, or if the beam selection matrix (w2b) of the precoding matrix cycle uses the order of {e1, e3, e2, e4}, co-phasing uses $\varphi_m$0=0, 1, ½, 3/2}pi, then the cycle of W2(i2) uses an order of {0, 2, 1, 3, 8, 10, 9, 11, 4, 6, 5, 7, 12, 14, 13, 15}.

For rank-2, it is assumed that the cycle is applied to the W2 matrix corresponding to (e1, e1), (e2, e2), (e3, e3), (e4, e4). If the cycle of W2 uses the order of {(e1, e1), (e4, e4), (e2, e2), (e3, e3)} for the beam selection, co-phasing use $\varphi_m$={0, 1} pi, and then the loop of W2(i2) uses an order of {0, 1, 6, 7, 2, 3, 4, 5}.

According to some embodiments of the present disclosure, a group of matrices which are enabled to be cyclically mapped to different transmission resources is determined, and the beamformed signals, which are obtained by beamforming one or more layers of signals through the matrices, are transmitted at different locations of the transmission resources, thereby improving the transmission performance of the transmission channel.

A signal transmission device is further provided in some embodiments of the present disclosure, including:

a first determining module, configured to determine a codebook C being a set of matrices W;

a second determining module, configured to determine a matrix set $\Omega$={W}∈C from the codebook C; and a transmission module, configured to generate one or more layers of signals, beamform the signals with matrixes in the matrix set $\Omega$, cyclically map the matrixes in the matrix set $\Omega$ to different locations of transmission resources, and transmit the beamformed signals at the different locations of the transmission resources;

Optionally, each matrix W is generated by transforming a phase $\phi$ of at least one Discrete Fourier Transform DFT vector V;

a set of DFT vectors corresponding to the matrices W in the matrix set $\Omega$ constitutes a group of adjacent DFT vectors V={$V_1$, $V_2$, ... $V_N$};

a set of phases corresponding to the matrices W in the matrix set $\Omega$ constitutes a set of adjacent phases $\Theta$={$\phi_1$, $\phi_2$, ... $\phi_K$};

the DFT vectors corresponding to the matrices W mapped to adjacent transmission resources are discontinuous in v={$V_1$, $V_2$, ... $V_N$}, or the phases $\phi$ corresponding to the matrices W mapped to adjacent transmission resources are discontinuous in $\Theta$={$\phi_1$, $\phi_2$, ... $\phi_K$}.

Optionally, the codebook C is of a dual-stage codebook structure, and in the codebook C, the matrices W=$W_1W_2$=$W_1W_{2b}W_{2c}$;

Optionally, each $W_1$ matrix is formed by N DFT beams which are adjacent to each other and oriented at different angles, where N is a positive integer;

a second-stage precoding matrix $W_{2b}$={$w_{2b,1}$, ... $w_{2b,L}$} is configured to perform a selection for beams in the $W_1$, where $w_{2b,1}$, ... $w_{2b,L}$ are beam selection matrices, L is a positive integer, a cyclic mapping manner of the $w_{2b,1}$, ... $w_{2b,L}$ is: selecting, from the matrices in the $W_1$, the matrices corresponding to the discontinuous DFT vectors for the adjacent transmission resources;

a second-stage precoding matrix $W_{2c}$={$w_{2c,k}$}$_{k=1, 2, ...}$ is configured to perform phase rotations for the beams in the $W_1$, where $w_{2c,k}$ is a phase transformation matrix.

Optionally, the codebook C is of a dual-stage codebook structure, and in the codebook C, the matrices W=$W_1W_2$=$W_1W_{2b}W_{2c}$;

Optionally, each $W_1$ matrix is formed by N DFT vectors which are adjacent to each other and oriented at different angles, where N is a positive integer;

a second-stage precoding matrix $W_{2b}$={$w_{2b,1}$, ... $w_{2b,L}$} is configured to perform a selection for the DFT vectors in the $W_1$, where $w_{2b,1}$, ... $w_{2b,L}$ are beam selection matrices, L is a positive integer;

a cyclic mapping manner of the $w_{2b,1}$, ... $w_{2b,L}$ is: selecting, from the matrices in the $W_1$, the matrices corresponding to the same or different DFT vectors for the adjacent transmission resources, where the selected DFT vectors are continuous or discontinuous when different DFT vectors are selected;

a second-stage precoding matrix $W_{2c}$={$w_{2c,k}$}$_{k=1, 2, ...}$ is configured to perform phase rotations for the beams in the $W_1$, where $w_{2c,k}$ is a phase transformation matrix, and a cyclic mapping manner of the $w_{2c,1}$, ... $w_{2c,K}$ is: selecting discontinuous phases from the second-stage precoding matrix $W_{2c}$={$w_{2c,k}$}$_{k=1, 2, ...}$.

Optionally, $\Theta=\{0,\pi\}$ or $\Theta=\{\pi/2, 3\pi/2\}$.

Optionally, a degree of separation of the matrices mapped to two adjacent transmission resources is greater than a preset value.

Optionally, the degree of separation of two matrices in the $W_{2b}$ mapped to the two adjacent transmission resources is maximized based on a distance measurement value, the degree of separation of the two matrices in the $W_{2b}$ is greater than a first preset value.

Optionally, a distance between the phase transformation matrices $w_{2c,k}$ in the $W_{2c}$ mapped to the adjacent transmission resources is greater than a second preset value.

Optionally, the transmission module is further configured to transmit indication information of a determined group of matrices which are enabled to be cyclically mapped to different transmission resources.

Optionally, the transmission module is further configured to transmit the indication information of the determined group of matrices which are enabled to be cyclically mapped to the different transmission resources by a semi-static signaling or a dynamic signaling.

It should be noted that the device is a device corresponding to the above method, and all embodiments in the above method are applicable to the embodiments of the device, and the same technical effects may be achieved.

A sending apparatus is further provided in some embodiments of the present disclosure, including: a processor, a memory connected to the processor through a bus interface, and a transceiver connected to the processor through a bus interface. The memory is used for storing the program and data used by the processor when performing the operation. The processor is configured to implement the following functional modules:

a first determining module, configured to determine a codebook C being a set of matrices W;

a second determining module, configured to determine a matrix set $\Omega=\{W\}\in C$ from the codebook C; and a transmission module, configured to generate one or more layers of signals, beamform the signals with matrixes in the matrix set $\Omega$, cyclically map the matrixes in the matrix set $\Omega$ to different locations of transmission resources, and transmit the beamformed signals at the different locations of the transmission resources.

In the sending apparatus in some embodiments of the present disclosure, the bus interface may be an interface in a bus architecture, and the bus architecture may include any number of interconnected buses and bridges. To be specific, one or more processors represented by the processor and memory represented by the memory are linked together. The bus architecture may also link together various other circuits such as peripheral devices, voltage regulators and power management circuits. The bus interface provides interfaces. The processor is responsible for managing the bus architecture and the usual processing. The memory may store the data that processor uses when performing operations.

The disclosed methods are applicable to the downlink (e.g., from the network to the mobile terminal) and the uplink (e.g., from the mobile terminal to the network). The "data" in the above statement may be any digital information bits including, but not limited to, user plane data and/or control plane data (carrying control information transmitted to or from a certain UE or group of UEs).

Figure 3:
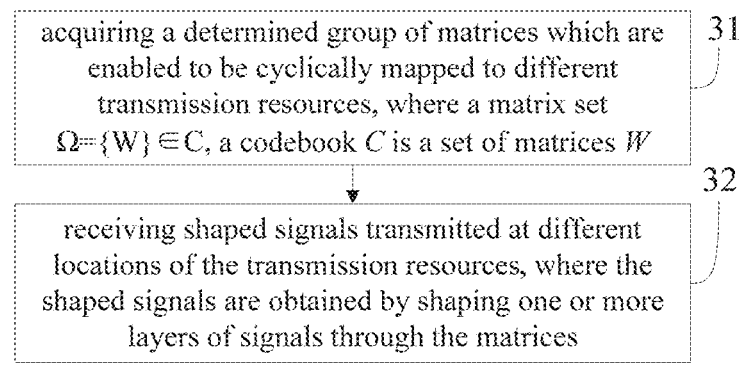
FIG. 3 is a flowchart of a signal transmission method at a receiving apparatus side in some embodiments of the present disclosure.

As shown in FIG. 3, a signal transmission method at a receiving apparatus side corresponding to the above method includes:

Step 31: acquiring a determined group of matrices which are enabled to be cyclically mapped to different transmission resources, where a matrix set $\Omega=\{W\}\in C$, a codebook C is a set of matrices W;

Step 32: receiving beamformed signals transmitted at different locations of the transmission resources, where the beamformed signals are obtained by beamforming one or more layers of signals through the matrices.

Optionally, each matrix W is generated by transforming a phase $\phi$ of at least one Discrete Fourier Transform DFT vector V;

a set of DFT vectors corresponding to the matrices W in the matrix set $\Omega$ constitutes a group of adjacent DFT vectors $V=\{V_1, V_2, \ldots V_N\}$;

a set of phases corresponding to the matrices W in the matrix set $\Omega$ constitutes a set of adjacent phases $\Theta=\{\phi_1, \phi_2, \ldots \phi_K\}$;

the DFT vectors corresponding to the matrices W mapped to adjacent transmission resources are discontinuous in $v=\{V_1, V_2, \ldots V_N\}$, or the phases $\phi$ corresponding to the matrices W mapped to adjacent transmission resources are discontinuous in $\Theta=\{\phi_1, \phi_2, \ldots \phi_K\}$.

Optionally, the codebook C is of a dual-stage codebook structure, and in the codebook C, the matrices $W=W_1W_2=W_1W_{2b}W_{2c}$.

Optionally, each $W_1$ matrix is formed by N DFT beams which are adjacent to each other and oriented at different angles, where N is a positive integer;

a second-stage precoding matrix $W_{2b}=\{w_{2b,1}, \ldots w_{2b,L}\}$ is configured to perform a selection for beams in the $W_1$, where $w_{2b,1}, \ldots w_{2b,L}$ are beam selection matrices, L is a positive integer, a cyclic mapping manner of the $w_{2b,1}, \ldots w_{2b,L}$ is: selecting, from the matrices in the $W_1$, the matrices corresponding to the discontinuous DFT vectors for the adjacent transmission resources;

a second-stage precoding matrix $W_{2c}=\{w_{2c,k}\}_{k=1, 2, \ldots}$ is configured to perform phase rotations for the beams in the $W_1$, where $w_{2c,k}$ is a phase transformation matrix.

Optionally, the codebook C is of a dual-stage codebook structure, and in the codebook C, the matrices $W=W_1W_2=W_1W_{2b}W_{2c}$;

Optionally, each $W_1$ matrix is formed by N DFT vectors which are adjacent to each other and oriented at different angles, where N is a positive integer;

a second-stage precoding matrix $W_{2b}=\{w_{2b,1}, \ldots w_{2b,L}\}$ is configured to perform a selection for the DFT vectors in the $W_1$, where $w_{2b,1}, \ldots w_{2b,L}$ are beam selection matrices, L is a positive integer;

a cyclic mapping manner of the $w_{2b,1}, \ldots w_{2b,L}$ is: selecting, from the matrices in the $W_1$, the matrices corresponding to the same or different DFT vectors for the adjacent transmission resources, where the selected DFT vectors are continuous or discontinuous when different DFT vectors are selected;

a second-stage precoding matrix $W_{2c}=\{w_{2c,k}\}_{k=1, 2, \ldots}$ is configured to perform phase rotations for the beams in the $W_1$, where $w_{2c,k}$ is a phase transformation matrix, and a cyclic mapping manner of the $w_{2c,1}, \ldots w_{2c,K}$ is: selecting discontinuous phases from the second-stage precoding matrix $W_{2c}=\{w_{2c,k}\}_{k=1, 2, \ldots}$.

Furthermore, all the examples of the matrix in the foregoing method embodiments are applicable to the embodiment of the method of the receiving apparatus, and the same technical effects may be achieved.

Corresponding to the method of the receiving apparatus, a signal transmission device is further provided in some embodiments of present disclosure, including:

an acquisition module, configured to acquire a determined group of matrices which are enabled to be cyclically mapped to different transmission resources, where a matrix set $\Omega=\{W\}\in C$, a codebook C is a set of matrices W;

a receiving module, configured to receive beamformed signals transmitted at different locations of the transmission resources, where the beamformed signals are obtained by beamforming one or more layers of signals through the matrices. It should be noted that all the examples of the precoding matrix in the foregoing method embodiments are applicable to the embodiment of the method of the receiving apparatus, and the same technical effects may be achieved.

Figure 4:
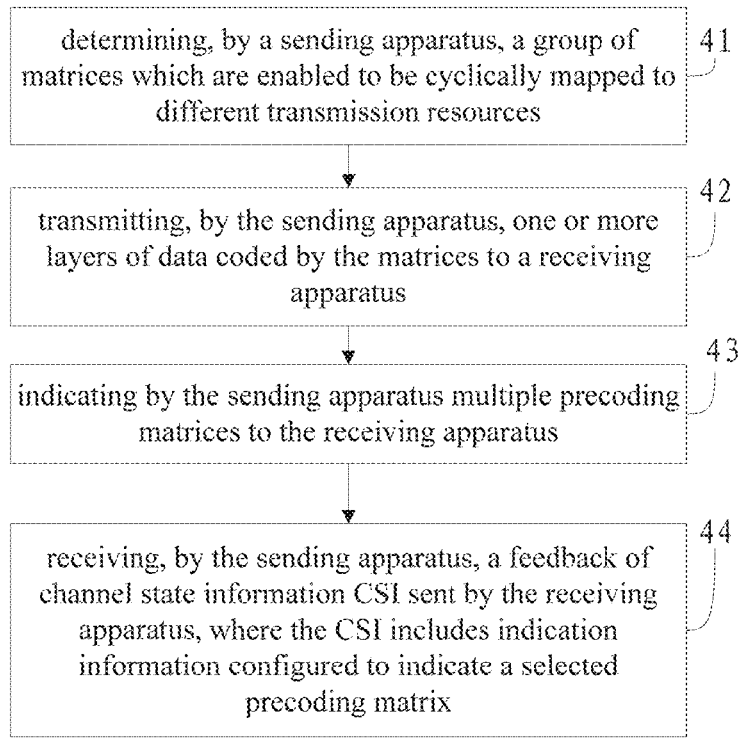
FIG. 4 is a flowchart of a method at a sending apparatus side when applied to the CSI feedback.

As shown in FIG. 4, when applied to CSI feedback, the method at the sending apparatus side includes:

Step 41: determining, by a sending apparatus, a group of matrices which are enabled to be cyclically mapped to different transmission resources;

Step 42: transmitting, by the sending apparatus, one or more layers of data precoded by the matrices to a receiving apparatus;

Step 43: indicating by the sending apparatus multiple precoding matrices to the receiving apparatus, which may be configured through a RRC signaling, and this step is optional;

Step 44: receiving, by the sending apparatus, a feedback of channel state information CSI sent by the receiving apparatus, where the CSI includes indication information configured to indicate a selected precoding matrix. This method is also applicable to DMRS transmissions.

A sending apparatus is further provided in some embodiments of the present disclosure, including:

a determining module, configured to determine a group of matrices which are enabled to be cyclically mapped to different transmission resources;

a transmitting module, configured to transmit one or more layers of data precoded by the matrices to a receiving apparatus; and a receiving module, configured to receive a feedback of channel state information CSI sent by the receiving apparatus, where the CSI includes indication information configured to indicate a selected precoding matrix.

Figure 5:
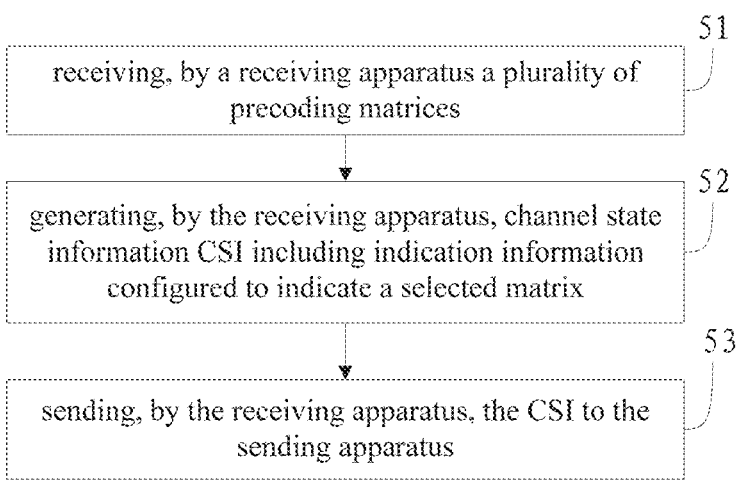
FIG. 5 is a flowchart of a method at a receiving apparatus side when applied to the CSI feedback.

As shown in FIG. 5, when applied to CSI feedback, the method at the receiving apparatus side includes:

Step 51: receiving, by a receiving apparatus and through a RRC signaling, a plurality of precoding matrices being a group of precoding matrices which are enabled to be cyclically mapped to different transmission resources;

Step 52: generating, by the receiving apparatus, channel state information CSI including indication information configured to indicate a selected matrix;

Step 53: sending, by the receiving apparatus, the CSI to the sending apparatus.

Again, this method is also applicable to DMRS transmissions.

A receiving apparatus is further provided in some embodiments of the present disclosure, including:

a receiving module, configured to receive a plurality of matrices being a group of matrices which are enabled to be cyclically mapped to different transmission resources;

a feedback module, configured to generate channel state information CSI including indication information configured to indicate a selected matrix; and a sending module, configured to send the CSI to the sending apparatus.

A receiving apparatus is further provided in some embodiments of the present disclosure, including:

a processor, a memory coupled to the processor via a bus interface, and a transceiver coupled to the processor via a bus interface, where the memory is configured to store programs and data used by the processor when performing operations, and the processor implements the following functions:

receiving an indication of the transmitter, where the indication carries a group of precoding matrices which are enabled to be cyclically mapped to different transmission resources; it should be noted that this step is optional;

receiving one or more layers of data which may be coded by a group of precoding matrices which are enabled to be cyclically mapped to different transmission resources.

Here, the group of precoding matrices which are enabled to be cyclically mapped to different transmission resources may be mapped according to the methods described in some embodiments of the present disclosure.

In the receiving apparatus in some embodiments of the present disclosure, the bus interface may be an interface in a bus architecture, and the bus architecture may include any number of interconnected buses and bridges. To be specific, one or more processors represented by the processor and memory represented by the memory are linked together. The bus architecture may also link together various other circuits such as peripheral devices, voltage regulators and power management circuits. The bus interface provides interfaces. The processor is responsible for managing the bus architecture and the usual processing. The memory may store the data that processor uses when performing operations.

The sending apparatus in some embodiments of the present disclosure may be a base station, or may be a transmitter of the base station, and the receiving apparatus may be a terminal or a receiver of the terminal. Of course, the sending apparatus may also be a terminal or a transmitter of a terminal. The receiving apparatus may also be a base station or a receiver of a base station.

The purpose of the design of the precoding matrix cycle under MIMO communication is to map non-contiguous/non-sequential beams on adjacent time/frequency resources. Specifically, a distance between precoding matrices mapped to adjacent time/frequency resources is maximized based on a particular distance measurement value and through non-continuous/non-sequential beams. In the non-ideal communication channel conditions, the robustness of the system is improved, so as to solve the attenuation of the channel amplitude.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

The above are merely some embodiments of the present disclosure. A person skilled in the art may make further modifications and improvements without departing from the principle of the present disclosure, and these modifications and improvements shall also fall within the scope of the present disclosure.

What is claimed is:

1. A signal transmission method, comprising:
   determining a codebook C, wherein the codebook C is a set of matrices W;
   determining a matrix set $\Omega=\{W\}\in C$ from the codebook C;
   generating one or more layers of signals, beamforming the signals with matrixes in the matrix set $\Omega$, and cyclically mapping the matrixes in the matrix set $\Omega$ to different locations of transmission resources; and
   transmitting the beamformed signals at the different locations of the transmission resources;
   wherein each matrix W is generated by transforming a phase $\phi$ of at least one Discrete Fourier Transform DFT vector V;
   a set of DFT vectors corresponding to the matrices W in the matrix set $\Omega$ constitutes a group of adjacent DFT vectors $V=\{V_1, V_2, \ldots V_N\}$;
   a set of phases corresponding to the matrices W in the matrix set $\Omega$ constitutes a set of adjacent phases $\Theta=\{\phi_1, \phi_2, \ldots \phi_L\}$;
   the phases $\phi$ corresponding to the matrices W mapped to adjacent transmission resources are discontinuous in $\Theta=\{\phi_1, \phi_2 \ldots \phi_K\}$.

2. The method according to claim 1, wherein the codebook C is of a dual-stage codebook structure, and in the codebook C, the matrices $W=W_1W_2=W_1W_{2b}W_{2c}$;
   wherein each $W_1$ matrix is formed by N DFT beams which are adjacent to each other and oriented at different angles, wherein N is a positive integer;
   a second-stage precoding matrix $W_{2b}=\{w_{2b,1}, \ldots w_{2b,L}\}$ is configured to perform a selection for beams in the $W_1$, wherein $w_{2b,1}, \ldots w_{2b,L}$ are beam selection matrices, L is a positive integer;
   a cyclic mapping manner of the $w_{2b,1}, \ldots w_{2b,L}$ is: selecting, from the matrices in the $W_1$, the matrices corresponding to the discontinuous DFT vectors for the adjacent transmission resources;
   a second-stage precoding matrix $W_{2c}=\{w_{2c,k}\}_{k=1,2,\ldots}$ is configured to perform phase rotations for the beams in the $W_1$, wherein $w_{2c,k}$ is a phase transformation matrix.

3. The method according to claim 2, wherein a degree of separation of the matrices mapped to two adjacent transmission resources is greater than a preset value; and/or
   a distance between the phase transformation matrices $w_{2c,k}$ in the $W_{2c}$ mapped to the adjacent transmission resources is greater than a second preset value.

4. The method according to claim 3, wherein the degree of separation of two matrices in the $W_{2b}$ mapped to the two adjacent transmission resources is maximized based on a distance measurement value, the degree of separation of the two matrices in the $W_{2b}$ is greater than a first preset value.

5. The method according to claim 1, wherein the codebook C is of a dual-stage codebook structure, and in the codebook C, the matrices $W=W_1W_2=W_1W_{2b}W_{2c}$;
   wherein each $W_1$ matrix is formed by N DFT vectors which are adjacent to each other and oriented at different angles, wherein N is a positive integer;
   a second-stage precoding matrix $W_{2b}=\{w_{2b,1}, \ldots w_{2b,L}\}$ is configured to perform a selection for the DFT vectors in the $W_1$, wherein $w_{2b,1}, \ldots w_{2b,L}$ are beam selection matrices, L is a positive integer;
   a cyclic mapping manner of the $w_{2b,1}, \ldots w_{2b,L}$ is: selecting, from the matrices in the $W_1$, the matrices corresponding to the same or different DFT vectors for the adjacent transmission resources, wherein the selected DFT vectors are continuous or discontinuous when different DFT vectors are selected;
   a second-stage precoding matrix $W_{2c}=\{w_{2c,k}\}_{k=1,2,\ldots}$ is configured to perform phase rotations for the beams in the $W_1$, wherein $w_{2c,k}$ is a phase transformation matrix, and a cyclic mapping manner of the $w_{2c,1}, \ldots w_{2c,K}$ is: selecting discontinuous phases from the second-stage precoding matrix $W_{2c}=\{w_{2c,k}\}_{k=1,2,\ldots}$.

6. The method according to claim 1, wherein $\Theta=\{0, \pi\}$ or $\Theta=\{\pi/2, 3\pi/2\}$.

7. The method according to claim 1, further comprising: transmitting indication information of a determined group of matrices which are enabled to be cyclically mapped to different transmission resources.

8. A signal transmission device, comprising: a processor, a memory and a transceiver, wherein the processor is configured to read a program stored in the memory to:
   determine a codebook C, wherein the codebook C is a set of matrices W;
   determine a matrix set $\Omega=\{W\}\in C$ from the codebook C; and
   generate one or more layers of signals, beamform the signals with matrixes in the matrix set $\Omega$, cyclically map the matrixes in the matrix set $\Omega$ to different locations of transmission resources, and transmit the beamformed signals at the different locations of the transmission resources;
   the transceiver is configured to receive and transmit data, and
   the memory is configured to store therein data for the operation of the processor;
   wherein each matrix W is generated by transforming a phase $\phi$ of at least one Discrete Fourier Transform DFT vector V;
   a set of DFT vectors corresponding to the matrices W in the matrix set $\Omega$ constitutes a group of adjacent DFT vectors $V=\{V_1, V_2, \ldots V_N\}$;
   a set of phases corresponding to the matrices W in the matrix set $\Omega$ constitutes a set of adjacent phases $\Theta=\{\phi_1, \phi_2, \ldots \phi_K\}$;
   the phases $\phi$ corresponding to the matrices W mapped to adjacent transmission resources are discontinuous in $\Theta=\{\phi_1, \phi_2, \ldots \phi_K\}$.

9. The device according to claim 8, wherein the codebook C is of a dual-stage codebook structure, and in the codebook C, the matrices $W=W_1W_2=W_1W_{2b}W_{2c}$;

wherein each $W_1$ matrix is formed by N DFT beams which are adjacent to each other and oriented at different angles, wherein N is a positive integer;

a second-stage precoding matrix $W_{2b}=\{w_{2b,1}, \ldots w_{2b,L}\}$ is configured to perform a selection for beams in the $W_1$, wherein $w_{2b,1}, \ldots w_{2b,L}$ are beam selection matrices, L is a positive integer;

a cyclic mapping manner of the $w_{2b,1}, \ldots w_{2b,L}$ is: selecting, from the matrices in the $W_1$, the matrices corresponding to the discontinuous DFT vectors for the adjacent transmission resources;

a second-stage precoding matrix $W_{2c}=\{w_{2c,k}\}_{k=1,2,\ldots}$ is configured to perform phase rotations for the beams in the $W_1$, wherein $w_{2c,k}$ is a phase transformation matrix.

10. The device according to claim 9, wherein a degree of separation of the matrices mapped to two adjacent transmission resources is greater than a preset value; and/or a distance between the phase transformation matrices $w_{2c,k}$ in the $W_{2c}$ mapped to the adjacent transmission resources is greater than a second preset value.

11. The device according to claim 8, wherein the codebook C is of a dual-stage codebook structure, and in the codebook C, the matrices $W=W_1W_2=W_1W_{2b}W_{2c}$;

wherein each $W_1$ matrix is formed by N DFT vectors which are adjacent to each other and oriented at different angles, wherein N is a positive integer;

a second-stage precoding matrix $W_{2b}=\{w_{2b,1}, \ldots w_{2b,L}\}$ is configured to perform a selection for the DFT vectors in the $W_1$, wherein $w_{2b,1}, \ldots w_{2b,L}$ are beam selection matrices, L is a positive integer;

a cyclic mapping manner of the $w_{2b,1}, \ldots w_{2b,L}$ is: selecting, from the matrices in the $W_1$, the matrices corresponding to the same or different DFT vectors for the adjacent transmission resources, wherein the selected DFT vectors are continuous or discontinuous when different DFT vectors are selected;

a second-stage precoding matrix $W_{2c}=\{w_{2c,k}\}_{k=1,2,\ldots}$ is configured to perform phase rotations for the beams in the $W_1$, wherein $w_{2c,k}$ is a phase transformation matrix, and a cyclic mapping manner of the $w_{2c,1}, \ldots w_{2c,K}$ is: selecting discontinuous phases from the second-stage precoding matrix $W_{2c}=\{w_{2c,k}\}_{k=1,2,\ldots}$.

12. The device according to claim 8, wherein $\Theta=\{0,\pi\}$ or $\Theta=\{\pi/2, 3\pi/2\}$.

13. The device according to claim 8, wherein the processor is configured to read the program stored in the memory to:

transmit indication information of a determined group of matrices which are enabled to be cyclically mapped to different transmission resources.

14. A signal receiving method, comprising:

acquiring a determined group of matrices which are cyclically mapped to different transmission resources, wherein a matrix set $\Omega=\{W\}\in C$, a codebook C is a set of matrices W;

receiving beamformed signals transmitted at different locations of the transmission resources, wherein the beamformed signals are obtained by beamforming one or more layers of signals through the matrices;

wherein each matrix W is generated by transforming a phase $\phi$ of at least one Discrete Fourier Transform DFT vector V;

a set of DFT vectors corresponding to the matrices W in the matrix set $\Omega$ constitutes a group of adjacent DFT vectors $V=\{V_1, V_2, \ldots V_N\}$;

a set of phases corresponding to the matrices W in the matrix set $\Omega$ constitutes a set of adjacent phases $\Theta=\{\phi_1, \phi_2, \ldots \phi_K\}$;

the phases $\phi$ corresponding to the matrices W mapped to adjacent transmission resources are discontinuous in $\Theta=\{\phi_1, \phi_2, \ldots \phi_K\}$.

15. The method according to claim 14, wherein the codebook C is of a dual-stage codebook structure, and in the codebook C, the matrices $W=W_1W_2=W_1W_{2b}W_{2c}$;

wherein each $W_1$ matrix is formed by N DFT beams which are adjacent to each other and oriented at different angles, wherein N is a positive integer;

a second-stage precoding matrix $W_{2b}=\{w_{2b,1}, \ldots w_{2b,L}\}$ is configured to perform a selection for beams in the $W_1$, wherein $w_{2b,1}, \ldots w_{2b,L}$ are beam selection matrices, L is a positive integer;

a cyclic mapping manner of the $w_{2b,1}, \ldots w_{2b,L}$ is: selecting, from the matrices in the $W_1$, the matrices corresponding to the discontinuous DFT vectors for the adjacent transmission resources;

a second-stage precoding matrix $W_{2c}=\{w_{2c,k}\}_{k=1,2,\ldots}$ is configured to perform phase rotations for the beams in the $W_1$, wherein $w_{2c,k}$ is a phase transformation matrix.

16. The method according to claim 14, wherein codebook C is of a dual-stage codebook structure, and in the codebook C, the matrices $W=W_1W_2=W_1W_{2b}W_{2c}$;

wherein each $W_1$ matrix is formed by N DFT vectors which are adjacent to each other and oriented at different angles, wherein N is a positive integer;

a second-stage precoding matrix $W_{2b}=\{w_{2b,1}, \ldots w_{2b,L}\}$ is configured to perform a selection for the DFT vectors in the $W_1$, wherein $w_{2b,1}, \ldots w_{2b,L}$ are beam selection matrices, L is a positive integer;

a cyclic mapping manner of the $w_{2b,1}, \ldots w_{2b,L}$ is: selecting, from the matrices in the $W_1$, the matrices corresponding to the same or different DFT vectors for the adjacent transmission resources, wherein the selected DFT vectors are continuous or discontinuous when different DFT vectors are selected;

a second-stage precoding matrix $W_2=\{w_{2c,k}\}_{k=1,2,\ldots}$ is configured to perform phase rotations for the beams in the $W_1$, wherein $w_{2c,k}$ is a phase transformation matrix, and a cyclic mapping manner of the $w_{2c,1}, \ldots w_{2c,K}$ is: selecting discontinuous phases from the second-stage precoding matrix $W_{2c}=\{w_{2c,k}\}_{k=1,2,\ldots}$.

17. A signal receiving device, comprising: a transceiver, a processor and a memory, wherein the processor is configured to read a program stored in the memory to perform the steps of the signal receiving method according to claim 14.

* * * * *